F. H. WATSON
July 5, 1932. PNEUMATIC INNER TUBE AND VALVE STEM Re. 18,513
Original Filed Oct. 23, 1930
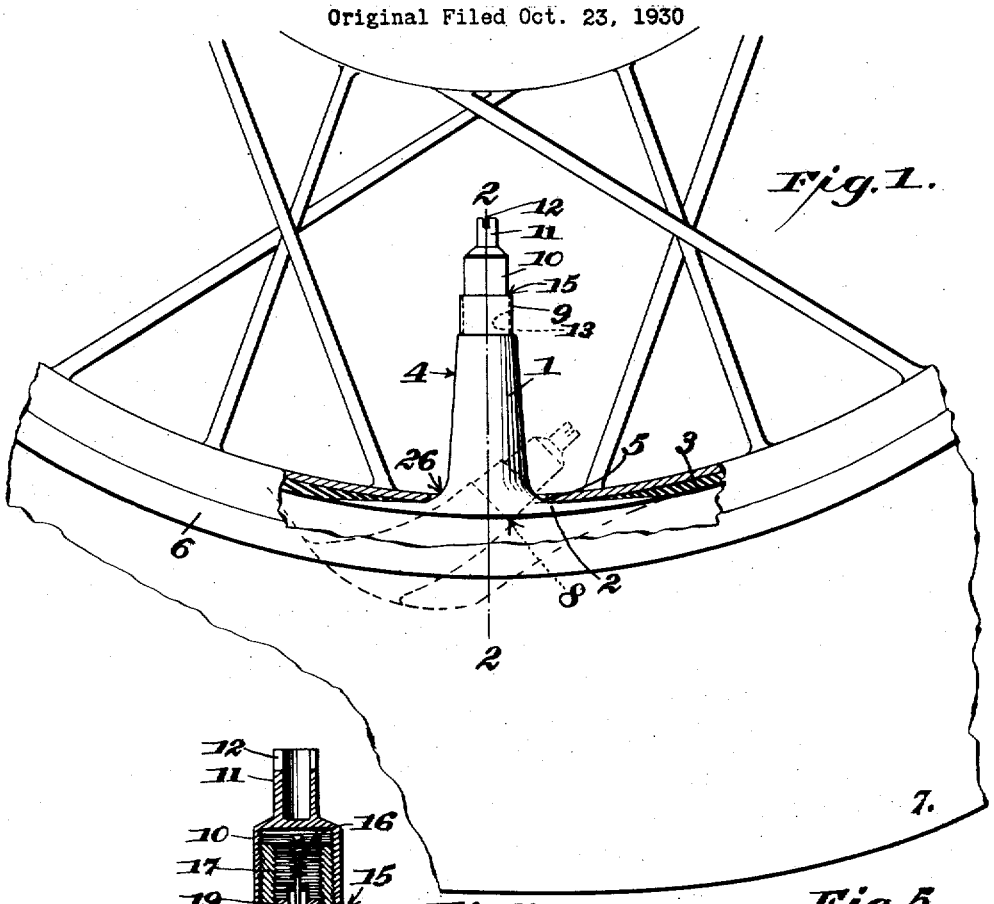
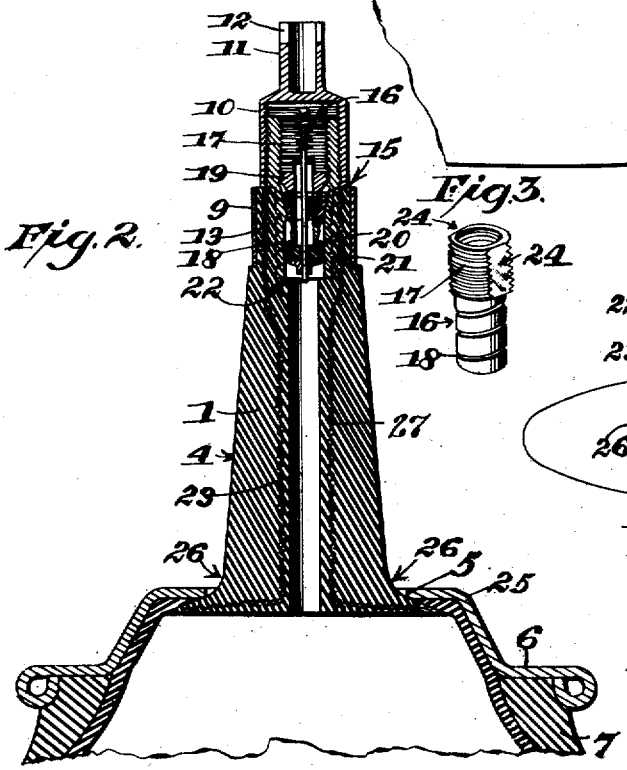
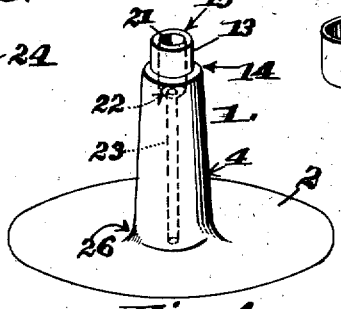
Fig. 4.
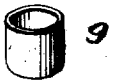
INVENTOR
Frank H. Watson
BY Munn & Co.
ATTORNEY Reissued July 5, 1932 Re. 18,513

UNITED STATES PATENT OFFICE

FRANK H. WATSON, OF JONESBORO, ARKANSAS, ASSIGNOR TO THE F. H. WATSON COMPANY, OF LITTLE ROCK, ARKANSAS, A CORPORATION OF DELAWARE

PNEUMATIC INNER TUBE AND VALVE STEM

Original No. 1,804,294, dated May 5, 1931, Serial No. 490,805, filed October 23, 1930. Application for reissue filed January 7, 1932. Serial No. 585,404.

This invention relates to improvements in pneumatic tires and it consists of the constructions, combinations and arrangements herein described and claimed.

One of the outstanding objects of the invention is to provide a pneumatic inner tube with an integral valve stem or filling tube of either the same or similar yieldable material for the purpose of enabling flexure to the stem in the event of deflation of the inner tube so that the stem can bend over and even flatten down against the inner tube during the distortions and strains to which the latter is then subjected, without any possibility of injury either to the valve stem or the delicate valve insides customarily used.

A further object of the invention, and one contributing largely to the successful functioning of the valve stem under the foregoing circumstances, is to taper the stem and to make the superimposed metallic parts of successively smaller diameters so that there will be no outstanding obstruction to hang in the hole in the wheel rim.

A further object of my invention is to so reduce and proportion the length of the metal parts making up the core, casing, and cap relative to the stem length and the wheel-rim orifice through which the stem is inserted and withdrawn, that, as a whole, the stem and its superposed parts can pass the rim aperture without jamming; and further there will be a sufficient length of yieldable stem to give the necessary flexibility for the stem and its associated parts to adapt themselves to any distorted positions without injury either to themselves or to the tube or casing.

A further object of the invention is to provide a combined valve stem of yieldable material and a separable core or valve insides container, the advantage of the latter being the ability of replacement in the event of any possible mechanical defect or damage in or to the original.

Another object of the invention is to provide a more effective and enduring air seal for the customary cap, a portion of the valve stem being so located as to provide a seat for the rim of the cap.

Other objects and advantages will appear in the following specification, reference being had to the accompanying drawing in which:

Figure 1 is a partial side elevation of a wheel having the improved inner tube and valve stem incorporated therein, portions being shown in section in order to illustrate internal construction.

Figure 2 is a vertical section taken on the line 2—2 of Figure 1.

Figure 3 is a detail perspective view of the improved core container.

Figure 4 is a perspective view of the yieldable valve stem body alone.

Figure 5 is a detail perspective view of the metallic sleeve or band.

Persons having had experience with deflated tires, either of the high pressure or balloon types, know that damage of minor or grave characters to the inner tube are apt to occur if the vehicle is kept running for even a short distance. The prevailing custom is to connect a metal valve stem with the inner tube by means of a jam nut, insert the valve stem through a hole in the rim and secure the valve stem to the rim with another jam nut.

In instances where the second jam nut is in place there is of course no possibility of the valve stem dropping inside of the casing upon deflation of the inner tube but there is the possibility of tearing the inner tube from its moorings to the valve stem by virtue of the creeping action of the casing over the inner tube and the resulting frictional pull on the inner tube that is bound to occur by virtue of the remaining air at least under atmospheric pressure.

Very often the motorist will omit the second jam nut, and then in the event of a deflated tire the foregoing frictional pull of the casing on the inner tube will draw the valve stem through the hole and bend it to such an extent that its further usefulness is instantly destroyed. This metal valve stem can then become the instrument of tearing the adjoining parts of the inner tube to pieces so that the usefulness of the tube also will be instantly destroyed.

The remedy herein proposed for these faults is a valve stem or body 1 of rubber or other yieldable material. This valve stem is made part of a flap 2 of oval or other configuration, which is intended to be cemented, vulcanized or otherwise attached to the inflatable tire member or tube 3 in the following manner. To all intents and purposes the valve stem is an integral part of the inner tube. The stem 1 is mounted so that the flap 2 contacts the inside of the tube 3 around the hole. This not only gives a part of the stem 1 the added function of reinforcing the tube, but eliminates the need for a patch customarily used in attaching the stem to the inner tube. This simplification of the construction enables an actual saving of from two to five cents on the mounting alone of the valve stem.

A feature of outstanding importance in the valve stem 1 is its tapering shape 4. This shape is purposely adopted as a means of enabling and insuring the passage of the valve stem 1 through the hole 5 in the rim 6 with the least possible resistance in the event of the deflation of the inner tube 3. Moreover, the tapering shape contributes to no small extent both to the easy flexure of the valve stem in passing through and to the erect posture when the tire is inflated.

Figure 1 illustrates the valve stem 1 in its normally erect position when the inner tube 3 is properly inflated. Upon deflation of the inner tube the valve stem 1 will drop through the hole 5, but during the motion of the casing 7 relatively to the rim 6 and the consequent shifting of the inner tube 3 there will also be an immediate tendency to bend the valve stem 1. The bent position is indicated in dotted lines 8. The tapering shape 4 facilitates the slipping of the valve stem through the hole 5, and even should the valve stem be flattened against the periphery of the rim 6 there would never be a rupture at its point of connection with the inner tube nor would there be any damage to the associated parts for reasons presently brought out.

Superimposed on the end of the valve stem 1 is a metallic sleeve 9 and valve cap 10. The valve cap has a tubular extension 11 which is slotted at 12 according to custom so as to enable using the inverted cap for the extraction of the core or insides. It is to be observed that the parts 9, 10 and 11 are of successively smaller diameters. This arrangement is purposely adopted in order to carry out the tapering shape 4 of the valve stem 1. There are no outstanding parts whatever that might in any way act as an obstruction of the free passage of the valve stem through the hole 5 in the foregoing event of the deflation of the inner tube 3. It is readily perceived that the sleeve 9, cap 10 and extension 11 will slip through the hole 5 just as easily as will the valve stem 1 itself, provided their combined lengths are properly proportioned, as specified, to the overall length of the stem and the diameter of the rim orifice A thimble end 13 of the valve stem 1 provides a shoulder 14 by virtue of its reduced diameter. It is upon this thimble end that the metallic sleeve 9 is forced under pressure. This sleeve can be fitted on so tightly that it will never come off in ordinary use. The thickness of the sleeve 9 is such that the outer surface does not come quite flush with the adjoining parts of the valve stem 1. This leaves a very slight annular projection of the valve stem at the base of the sleeve 9, the purpose being an insurance of the step down in size between the two A fabric liner 27, incorporated in the valve stem 1, extends into the thimble end or terminal 13 for the purpose of reinforcing the latter. In practice the amount of rubber between the sleeve 9 and the extended fabric in the thimble end 13 is very little. The thinness of the rubber at this place enables a virtual grip of the sleeve on the fabric, thus preventing the forcible slipping off of the sleeve under pressure.

An important function of the metallic sleeve 9 is to confine the rubber or other yieldable material of which the thimble end 13 is composed. A narrow, annular portion of the thimble 13 appears inside of the upper end of the sleeve 9 providing a seat 15 against which the rim of the cap 10 can be forced in screwing the cap down thus to make an air tight joint.

The prevailing custom in making valve caps is to employ a rubber washer on the inside. In repeatedly screwing the cap down against the metallic valve stem this washer becomes grooved and sometimes cut to such an extent that it will not hold compression and since the valve cap is often relied upon to hold compression it follows that flat tires often result from the fault at this point. By confining the portion 15 by the sleeve 9 there is no possibility whatever of spreading of the rubber, and it is immaterial how often the cap 10 is screwed down because there will always be available material to compose an efficient valve seat. To this end the external diameter of the cap 10 is less than the internal diameter of the sleeve 9 so that the cap can be screwed down into the sleeve if necessary.

Situated on the inside of the thimble 13 is a core or valve insides container 16 (Fig. 3). This comprises tubular portions 17, 18 of which the latter is smaller than the former.

The portion 17 is threaded both externally and internally respectively to receive the cap 10 and to receive the follower 19 of the core or insides 20. The core may be of any known type.

The tubular portion 18 has a quick-hitch thread (Fig. 3) which insures the holding of the core container in place and enables its quick application when screwing the core container 16 into the chamber 12 that occurs at the upper end of the valve stem 1. This chamber extends down past the level of the shoulder 14 and terminates at a shoulder 22 whence the bore 23 extends to the base of the tube 1 and to the inside of the inner tube 3.

Screwing in of the core container 16 is continued until the portions 17, 18 rest on the respective seat 15 and shoulder 22. The portion 17 may be flattened on opposite sides as at 24 (Fig. 3) to provide a pincer hold and thus avoid damaging the threads.

In practice it is not absolutely essential that the portion 18 shall abut the shoulder 22. The portion 17 acts largely in the capacity of an internal filler for the thimble end 13. The thimble end will be under great compression between the portions 17 and sleeve 9, and like the sleeve 9 the portion 17 prevents spreading of the confined material so that the valve cap seat 15 will always retain a desired uniformity.

It is to be observed that the rim 6, heretofore generally alluded to, is of the type known as drop center. The drop center 25 (Fig. 2) consists of an annular depression in the rim. It is in rims of this type that havoc is wrought most notably to the inner tubes and valve stems upon deflation because the same design of structure that facilitates an easy application of the casing 7 in the first place also makes a quick release of the casing upon deflation of the inner tube.

It is not uncommon for the casing to fly off of the rim almost immediately upon deflation. This means that unless some safety provision is adopted the inner tube will be instantly torn to pieces. By providing the inner tube with the valve stem 1, bearing in mind its specific shape as well as appurtenances, the inner tube can effect a release from the rim as easily as the casing and even should the stem 1 be bent completely over no harm would come to it.

In rare instances the core container 16 may sustain damage which although minor may warrant its removal. For example, the screw threads on the portion 17 might become stripped. In such case the container 16 is readily separable from the rest of the valve stem 1, and a new container 16 can be inserted as easily as a new core 20.

The customarily needed and used jam nuts first alluded to are not required in connection with the improved valve stem 1. Sole reliance is put on the fact of friction between the inner tube 3 and its contacting parts to keep it and the valve stem in place. It is intended that the valve stem 1 shall clear the hole 5 quickly and easily upon deflation of the inner tube, hence the omission of any of the known kinds of anchoring means.

It is to be observed in both Figures 1 and 2 that the base of the stem 1 is fully rounded at 26 at the place of mergence with the flap 2. In addition to strengthening the connection of the stem 1 with the flap the rounding 26 produces a seal around the edge of the hole 5. The natural expansion of the air in the inner tube presses the rounded base 26 against the edge of the hole making a joint that will exclude both dirt and water. Drop center wheels do not customarily carry inner tube flaps thus making possible a direct contact of the rounding 26 with the edge of the hole. Furthermore the rounded area 26 which merges into the tapered stem surface, provides a surface which, in event of deflation and sudden withdrawal of the stem through the aperture in the rim, will ride easily over the edge of the rim aperture, lead the stem naturally and gradually to the rim aperture, and eliminate any catching or checking of the tapering stem in its delivery under stress from the rim aperture.

While the construction and arrangement of the improved pneumatic inner tube and valve stem is that of a generally preferred form, obviously modifications and changes may be made without departing from the spirit of the invention or the scope of the claims.

I claim:

1. A valve stem of yieldable material, a cap, a core container carried by the stem and carrying the cap, and means confining the stem material around a portion of said container, leaving an exposed annulus to provide a seat, said means being of greater internal diameter than the external diameter of the cap enabling fitting of the rim of the cap down inside of said means.

2. A valve stem having a thimble providing an external shoulder, an internal bore ending in a chamber and providing a shoulder, a core container having a core and including a portion inserted in the chamber in contact with the shoulder and having a larger portion extending above the thimble, a cap fitted on said larger portion to protect the core, and a sleeve fitted on the thimble to confine the stem material therein, said confined material providing a seat for the rim of the cap.

3. A valve stem, a core container having a portion inserted into said stem and a core, a cylindrical sleeve to assist in holding the container on the stem, and a cylindrical cap fitted on said container to protect the core, said stem and cap being in substantially end to end contact, and said stem, sleeve, and cap being of successively smaller diameters to establish a generally tapering configuration.

4. A tubular valve stem composed of yieldable material having tapering sides and a cylindrical thimble end of minor length being of lesser diameter than the adjacent part of the stem, a core container having a portion fitted in the stem, said portion being substantially co-extensive with said thimble end leaving the major part of the stem flexible, and a cap fitted on the exposed remainder of said container being of lesser diameter than the thimble end.

5. A yieldable valve stem for tires comprising a base-member adapted to be secured to a tire, a stem-member having a longitudinal bore, and provided with a tapering exterior, and relatively rigid valve parts the external diameter of which valve parts is not greater than the smallest exterior diameter of said stem-member carried by and extending upwardly from the upper end of the stem-member, said valve parts being of a length and diameter relative to the length of said stem-member to allow free flexing of the stem-member substantially throughout its length and permit it readily to pass without jamming through a rim aperture and prevent injury to stem or tire when the tire is deflated.

6. A yieldable valve stem for tires comprising a base-member adapted to be secured to a tire, a stem-member having a longitudinal bore joined to said base-member and having a curved mergence area with said base-member at the point of joinder, said stem-member having a tapering exterior, and relatively rigid valve parts the external diameter of which valve parts is not greater than the smallest exterior diameter of said stem-member mounted on and extending upwardly from the upper end of the stem-member, said valve parts being of a length and diameter relative to the length of said stem-member to allow free flexing of the stem-member substantially throughout its length and permit it readily to pass without jamming through a rim aperture and prevent injury to stem or tire when the tire is deflated.

7. A yieldable valve stem for tires comprising a base-member adapted to be secured to a tire, and a stem-member of gradually decreasing diameter from its bottom upwardly joined to said base-member, said stem-member being uniformly and increasingly yieldable from its bottom upwardly and having an internal bore of uniform diameter with valve parts disposed therein at its top.

8. A yieldable valve stem for tires comprising a base-member adapted to be secured to a tire, and a stem-member of gradually decreasing diameter from its bottom upwardly joined to said base-member, said stem-member being uniformly and increasingly yieldable from its bottom upwardly and having an internal bore of uniform diameter terminating at the top in an enlarged socket to receive valve parts.

9. A yieldable valve stem for tires comprising a base-member adapted to be secured to a tire, and a stem-member of gradually decreasing diameter from its bottom upwardly joined to said base-member, said stem-member being uniformly and increasingly yieldable from its bottom upwardly and having an internal bore terminating at the top in an enlarged socket to receive valve parts, the length of said socket relative to the length of the stem being such as to permit the stem-member to flex freely and contained valve parts readily to pass a rim aperture.

10. In combination, a tubular rubber composition valve stem, a base at one end of the stem for engaging the stem with an inner tube, and a valve assembly secured in the opposite end portion of said stem and spaced from said base so that the major portion of the rubber composition of the stem and which is disposed between the base and the valve assembly is freely flexible, said rubber composition stem having its outer wall tapered from the base toward the valve assembly, the maximum diameter of the metallic assembly being less than the minimum diameter of the exposed portion of the valve stem, whereby that portion of the valve assembly projecting beyond the end of the rubber valve stem presents in effect a continuation of the tapering surface of said rubber stem.

11. In combination, a valve stem of yieldable material, means carried by the stem and having a relatively short extension beyond the tip end of the stem, said extension having a cross section smaller than that of the tip end of the stem so that the latter presents a shoulder at the base of said extension, and a cap engageable with said means and having a rim which seats on said shoulder when the cap is fully engaged with said means.

12. In combination, a valve stem of yieldable material, means carried by the stem and having a relatively short extension beyond the tip end of the stem, said extension having a cross section smaller than that of the tip end of the stem so that the latter presents a shoulder at the base of said extension, a cap engageable with said means and having a rim which seats on said shoulder when the cap is fully engaged with said means, and means for confining the tip portion of said stem for maintaining the durability of the seat portion thereof.

13. A vulcanized inner tube for a pneumatic tire casing adapted to be mounted on an apertured rim, said tube having a flexible vulcanized rubber stem adapted to be projected through the aperture in a rim, said rubber stem being nonmetallicly and airtightly joined to the inner tube; valve means for inflating the inner tube carried by said stem at its end remote from the inner tube, said stem and valve means being dimensioned and arranged and said stem being of a cross sectional area at its valve means carrying portion substantially less than the area of the opening in the rim so as normally to permit the withdrawal of said stem and valve means through the aperture in the rim on deflation of the inner tube in service while rotating without damaging said tube or stem.

In testimony whereof I have hereunto set my hand.

FRANK H. WATSON.